(12) United States Patent
Ackerly

(10) Patent No.: US 10,114,900 B2
(45) Date of Patent: Oct. 30, 2018

(54) METHODS AND SYSTEMS FOR GENERATING PROBABILISTICALLY SEARCHABLE MESSAGES

(71) Applicant: Virtru Corporation, Washington, DC (US)

(72) Inventor: William Ackerly, Washington, DC (US)

(73) Assignee: Virtru Corporation, Washington, DC (US)

( * ) Notice: Subject to any disclaimer, the term of this patent is extended or adjusted under 35 U.S.C. 154(b) by 166 days.

(21) Appl. No.: 15/073,933

(22) Filed: Mar. 18, 2016

(65) Prior Publication Data

US 2016/0283600 A1 Sep. 29, 2016

Related U.S. Application Data

(60) Provisional application No. 62/136,937, filed on Mar. 23, 2015.

(51) Int. Cl.
*H04L 29/06* (2006.01)
*G06F 17/30* (2006.01)
*H04L 9/06* (2006.01)

(52) U.S. Cl.
CPC ...... *G06F 17/30867* (2013.01); *H04L 9/0643* (2013.01); *H04L 63/04* (2013.01)

(58) Field of Classification Search
CPC .. G06F 17/30867; H04L 63/04; H04L 9/0643
See application file for complete search history.

(56) References Cited

U.S. PATENT DOCUMENTS

| 2007/0185868 | A1  | 8/2007 | Roth et al. | |
|---|---|---|---|---|
| 2010/0169329 | A1  | 7/2010 | Frieder et al. | |
| 2011/0004599 | A1* | 1/2011 | Deninger | G06F 17/30628 707/747 |
| 2014/0082488 | A1* | 3/2014 | Lorenzen | G06F 17/274 715/271 |

FOREIGN PATENT DOCUMENTS

WO    2009085845 A2    7/2009

OTHER PUBLICATIONS

International Search Report and Written Opinion in connection with PCT/US2016/023423, dated Jun. 29, 2016, 13 pages.

* cited by examiner

*Primary Examiner* — Abiy Getachew
(74) *Attorney, Agent, or Firm* — Blueshift IP, LLC; Cynthia M. Gilbert

(57) ABSTRACT

A computer-implemented method for generating probabilistically searchable messages includes obtaining, by a computing device, a textual message. The method includes extracting, by the computing device, from the textual message, a plurality of words. The method includes cryptographically hashing, by the computing device, each word of the plurality of words. The method includes mapping, by the computing device, each cryptographically hashed word to a plurality of tokens. The method includes generating, by the computing device, a set of tokens associated with the textual message, the set of tokens including each plurality of tokens associated with each cryptographically hashed word. The method includes storing, by the computing device, the set of tokens associated with the textual message in metadata associated with the textual message.

20 Claims, 10 Drawing Sheets

350

352: Received: by 10.0.0.1 with HTTP
Date: Thu, 5 Mar 2015 07:59:08 -0500
From: <sender@domainname.com >
Message-ID: <misc.misc@domainname.com>
To: <recipient@domainname.com>
Subject: Snow Day!
Content-Type: text/plain 358: An unencrypted text intro may go here.

354: 001 005 006 007 00m 00s 01k 01o 01t 02d 02j 02y 03l 03t 04l 04l
04m 04x 053 055 067 06b 06j 06s 07s 07t 084 08a 08o 08z 093 09f
0a5 0a6 0aa 0an 0ar 0b4 0bo 0by 0c4 0cd 0ce 0co 0cv 0d9 0dh 0dk

356: --- START PROTECTED MESSAGE TDF 0 ---

PD94bWwgdmVyx2lvbjiodoppfd4WWsoHJiopp]]redsvck jxllodoop
8dGRlkd90vmdpost5490cbnxmofi854b[dsfkjigho46eu09 vjdkkl90

*Fig. 3D*

METHODS AND SYSTEMS FOR GENERATING PROBABILISTICALLY SEARCHABLE MESSAGES

CROSS-REFERENCE TO RELATED APPLICATIONS

The application claims priority from U.S. Provisional Patent Application Ser. No. 62/136,937, filed on Mar. 23, 2015, entitled "Methods and Systems for Generating Probabilistically Searchable Messages," which is hereby incorporated by reference.

BACKGROUND

The disclosure relates to privacy-preserving search techniques. More particularly, the methods and systems described herein relate to generating probabilistically searchable messages.

Electronically conveyed messages, such as email messages, can furnish a convenient means of communication, but they also give rise to security concerns. If transmitted according to conventional protocols, such messages may be readily examined by intercepting third parties or mined for advertisement purposes by email services. Encrypting messages prevents unwanted parties from reading them, but typically decreases the convenience of using the messages as a result. In particular, while electronic messages are typically searchable, encrypted messages typically are not; the service provider that performs the searches cannot index encrypted messages because the message contents are obfuscated.

BRIEF SUMMARY

In one aspect, a computer-implemented method for generating probabilistically searchable messages includes obtaining, by a computing device, a textual message. The method includes extracting, by the computing device, from the textual message, a plurality of words. The method includes cryptographically hashing, by the computing device, each word of the plurality of words. The method includes mapping, by the computing device, each cryptographically hashed word to a plurality of tokens. The method includes generating, by the computing device, a set of tokens associated with the textual message, the set of tokens including each plurality of tokens associated with each cryptographically hashed word. The method includes storing, by the computing device, the set of tokens associated with the textual message in metadata associated with the textual message.

In one aspect, a computer-implemented method for searching probabilistically searchable messages includes obtaining, by a computing device, from a user, a textual query. The method includes extracting, by the computing device, from the textual query, at least one word. The method includes cryptographically hashing, by the computing device, the at least one word. The method includes mapping, by the computing device, the cryptographically hashed at least one word to a plurality of tokens. The method includes generating, by the computing device, a set of tokens associated with the textual query, the set of tokens including each plurality of tokens associated with each cryptographically hashed word. The method includes receiving, by the computing device, from a search engine, at least one textual message including metadata comprising the set of tokens.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3D is a screenshot depicting an embodiment of a textual message with embedded search tokens.

DETAILED DESCRIPTION

In some embodiments, the methods and systems described herein relate to generating and searching probabilistically searchable messages. Before describing such methods and systems in detail, however, a description is provided of a network in which such methods and systems may be implemented.

Figure 1A:
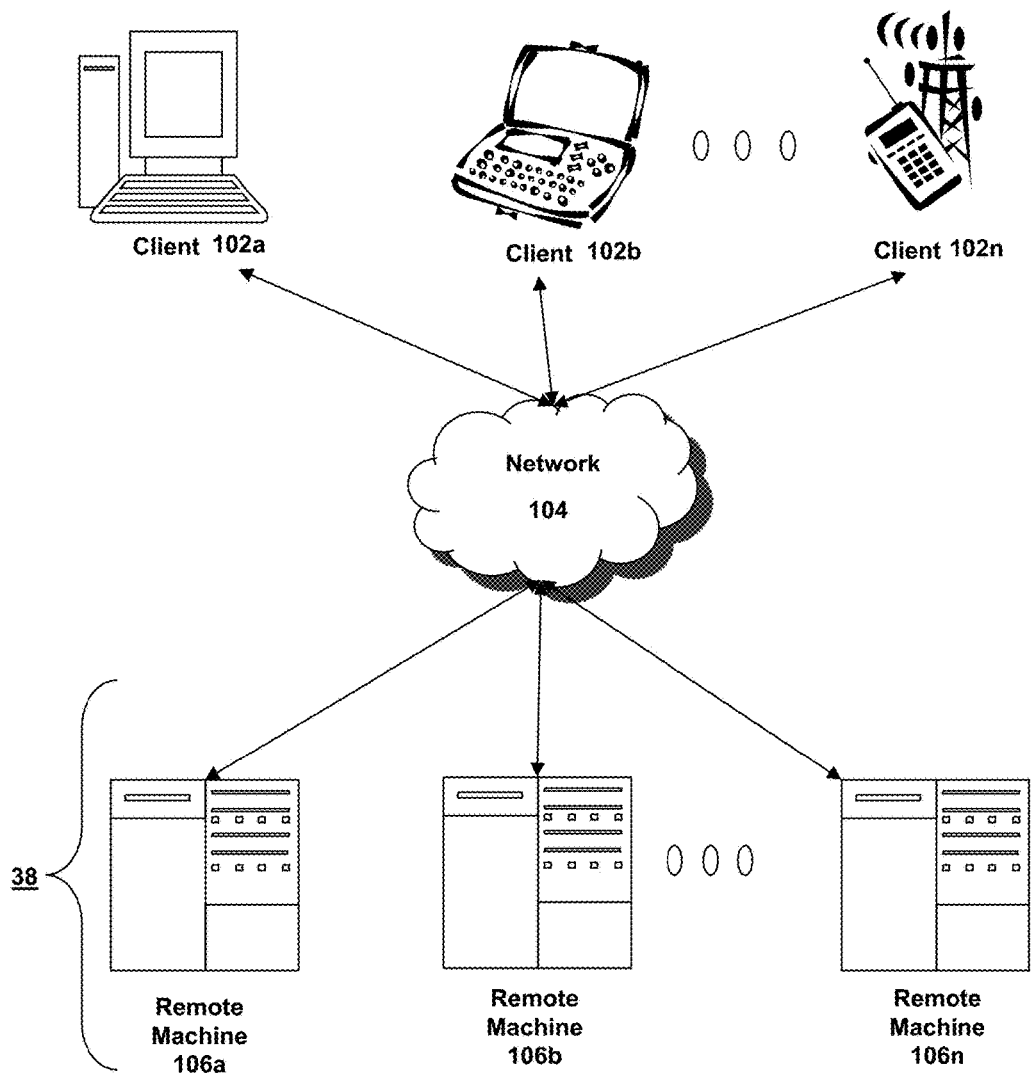
FIGS. 1A-1C are block diagrams depicting embodiments of computers useful in connection with the methods and systems described herein.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, computing device(s) 102, endpoint(s) 102, or endpoint node(s) 102) in communication with one or more remote machines 106a-106n (also generally referred to as server(s) 106 or computing device(s) 106) via one or more networks 104.

Although FIG. 1A shows a network 104 between the clients 102 and the remote machines 106, the clients 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS, or UMTS. In some embodiments, different types of data may be transmitted via different protocols. In other embodiments, the same types of data may be transmitted via different protocols.

A client 102 and a remote machine 106 (referred to generally as computing devices 100) can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 102 may execute, operate or otherwise provide an application, which can be any type and/or form of software, program, or executable instructions, including, without limitation, any type and/or form of web browser, web-based client, client-server application, an ActiveX control, or JAVA applet, or any other type and/or form of executable instructions capable of executing on client 102.

In one embodiment, a computing device 106 provides functionality of a web server. In some embodiments, a web server 106 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, Wash.; the ORACLE IPLANET web server products provided by Oracle Corporation of Redwood Shores, Calif.; or the BEA WEBLOGIC products provided by BEA Systems of Santa Clara, Calif.

In some embodiments, the system may include multiple, logically-grouped remote machines 106. In one of these embodiments, the logical group of remote machines may be referred to as a server farm 38. In another of these embodiments, the server farm 38 may be administered as a single entity.

Figure 1B:
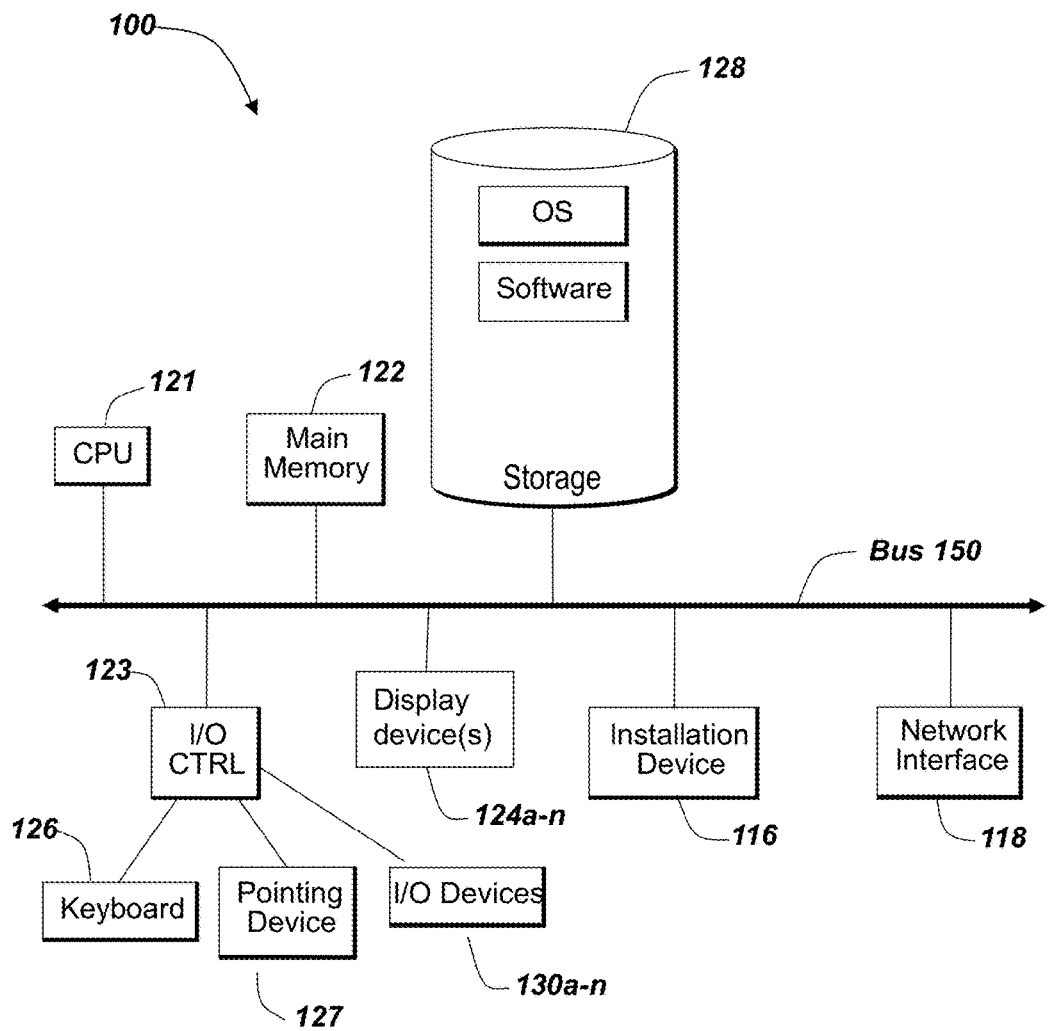
Figure 1C:
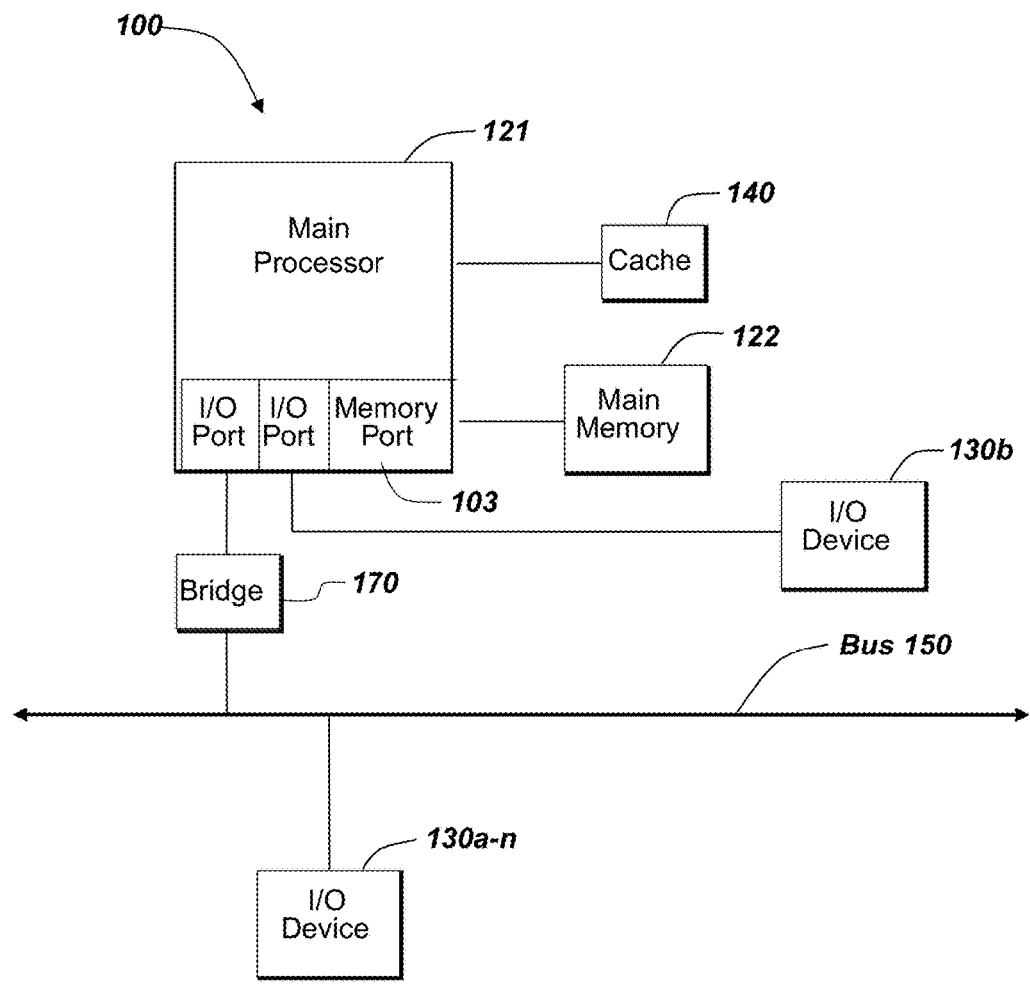

FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126, a pointing device 127, such as a mouse, and one or more other I/O devices 130a-n. The storage device 128 may include, without limitation, an operating system and software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121. The main memory 122 may be based on any available memory chips capable of operating as described herein. In the embodiment shown in FIG. 1B, the processor 121 communicates with main memory 122 via a system bus 150. FIG. 1C depicts an embodiment of a computing device 100 in which the processor communicates directly with main memory 122 via a memory port 103. FIG. 1C also depicts an embodiment in which the main processor 121 communicates directly with cache memory 140 via a secondary bus, sometimes referred to as a backside bus. In other embodiments, the main processor 121 communicates with cache memory 140 using the system bus 150.

In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 also communicates directly with an I/O device 130b via, for example, HYPERTRANSPORT, RAPIDIO, or INFINIBAND communications technology.

A wide variety of I/O devices 130a-130n may be present in the computing device 100. Input devices include keyboards, mice, trackpads, trackballs, microphones, scanners, cameras, and drawing tablets. Output devices include video displays, speakers, inkjet printers, laser printers, and dye-sublimation printers. The I/O devices may be controlled by an I/O controller 123 as shown in FIG. 1B. Furthermore, an I/O device may also provide storage and/or an installation medium 116 for the computing device 100. In some embodiments, the computing device 100 may provide USB connections (not shown) to receive handheld USB storage devices such as the USB Flash Drive line of devices manufactured by Twintech Industry, Inc. of Los Alamitos, Calif.

Referring still to FIG. 1B, the computing device 100 may support any suitable installation device 116, such as a floppy disk drive for receiving floppy disks such as 3.5-inch disks, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other software.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax, and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem, or any other device suitable for interfacing the computing device 100 to any type of network capable of communication and performing the operations described herein.

In some embodiments, the computing device 100 may comprise or be connected to multiple display devices 124a-124n, of which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, and WINDOWS VISTA, all of which are manufactured by Microsoft Corporation of Redmond, Wash.; MAC OS manufactured by Apple Inc. of Cupertino, Calif.; OS/2 manufactured by International Business Machines of Armonk, N.Y.; and LINUX, a freely-available operating system distributed by Caldera Corp. of Salt Lake City, Utah, or any type and/or form of a UNIX operating system, among others.

The computing device 100 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 100 may have different processors, operating systems, and input devices consistent with the device. In other embodiments the computing device 100 is a mobile device, such as a JAVA-enabled cellular telephone or personal digital assistant (PDA). The computing device 100 may be a mobile device such as those manufactured, by way of example and without limitation, by Motorola Corp. of Schaumburg, Ill., USA; Kyocera of Kyoto, Japan; Samsung Electronics Co., Ltd. of Seoul, Korea; Nokia of Finland; Hewlett-Packard Development Company, L.P. and/or Palm, Inc. of Sunnyvale, Calif., USA; Sony Ericsson Mobile Communications AB of Lund, Sweden; or Research In Motion Limited, of Waterloo, Ontario, Canada. In yet other embodiments, the computing device 100 is a smart phone, POCKET PC, POCKET PC PHONE, or other portable mobile device supporting Microsoft Windows Mobile Software.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc. of Cupertino, Calif. In another of these embodiments, the digital audio player may function as both a portable media player and as a mass storage device. In other embodiments, the computing device 100 is a digital audio player such as those manufactured by, for example, and without limitation, Samsung Electronics America of Ridgefield Park, N.J.; Motorola Inc. of Schaumburg, Ill.; or Creative Technologies Ltd. of Singapore. In yet other embodiments, the computing device 100 is a portable media player or digital audio player supporting file formats including, but not limited to, MP3, WAV, M4A/AAC, WMA Protected AAC, AEFF, Audible audiobook, Apple Lossless audio file formats, and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a device in the Motorola line of combination digital audio players and mobile phones. In another of these embodiments, the computing device 100 is a device in the IPHONE smartphone line of devices manufactured by Apple Inc. of Cupertino, Calif. In still another of these embodiments, the computing device 100 is a device executing the ANDROID open source mobile phone platform distributed by the Open Handset Alliance; for example, the device 100 may be a device such as those provided by Samsung Electronics of Seoul, Korea, or HTC Headquarters of Taiwan, R.O.C. In other embodiments, the computing device 100 is a tablet device such as, for example and without limitation, the IPAD line of devices manufactured by Apple Inc.; the PLAYBOOK manufactured by Research In Motion; the CRUZ line of devices manufactured by Velocity Micro, Inc. of Richmond, Va.; the FOLIO and THRIVE line of devices manufactured by Toshiba America Information Systems, Inc. of Irvine, Calif.; the GALAXY line of devices manufactured by Samsung; the HP SLATE line of devices manufactured by Hewlett-Packard; and the STREAK line of devices manufactured by Dell, Inc. of Round Rock, Tex.

Some embodiments of the disclosed system and method involve the use of cryptographic systems. A cryptographic system is a set of protocols or algorithms whereby a data set, known as "plaintext," which is coherent in a particular format readable for a person or machine, is converted to a related data set, known as "cyphertext," which is typically not coherent for any person or machine unless first converted back into plaintext. The plaintext may be any set of data that may be stored or interpreted by computing devices 100 as described above in connection with FIGS. 1A-1C. The plaintext may be a character array, such as a string of human-readable symbols. The plaintext may be an image file, such as a Joint Photographic Experts Group ("JPEG") file. The plaintext may be an audio file, such as a Moving Pictures Experts Group-Audio Layer III ("MP3") file. The plaintext may be a video file, such as a Moving Pictures Experts Group ("MPEG") file. The cryptographic system may translate the plaintext into cyphertext by performing one or more mathematical operations on the plaintext. The process of converting plaintext into cyphertext is known as "encryption." The cyphertext may be referred to as "encrypted." The cryptographic system may use another dataset called an "encryption key" to encrypt the plaintext. In one embodiment, an encryption key is any data that enables a cryptographic system to encrypt plaintext into cyphertext. In some embodiments, the cryptographic system also includes a protocol for converting cyphertext back into plaintext. The process of converting the cyphertext back into plaintext may be called "decryption." A "decryption key" is any data that enables a crypto system to decrypt cyphertext, producing its corresponding plaintext.

In some cryptographic systems, known as "symmetric" cryptographic systems, the decryption key is sufficiently similar to the encryption key that possession of either the decryption or encryption key trivially enables a computing device 100 to determine the encryption or decryption key, respectively. The encryption and decryption keys in symmetric cryptographic systems may be kept secret, and shared only with persons or entities that the user of the cryptographic system wishes to be able to decrypt the cyphertext. One example of a symmetric cryptographic system is AES, which arranges plaintext into matrices and then modifies the matrices through repeated permutations and arithmetic operations with an encryption key. In embodiments of cryptographic systems that are "asymmetric," either the encryption or decryption key cannot be readily deduced without additional secret knowledge, even given the possession of the corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which the encryption key involves the use of numbers that are products of very large prime numbers, but the decryption key involves the use of those very large prime numbers, such that deducing the decryption key from the encryption key requires the practically infeasible task of computing the prime factors of a number which is the product of two very large prime numbers.

Embodiments of the disclosed system and method create tokens corresponding to the contents of textual messages, so that search engines, including third-party search engines, may index a textual message, even if the body of the message is encrypted. Each word may be cryptographically hashed so that the meaning of the word is not ascertainable from the tokens; in addition, the tokens may be inserted as metadata in arbitrary order, and random additional tokens may be added, greatly reducing the risk of correlative attacks and attacks based on traffic analysis.

Figure 2A:
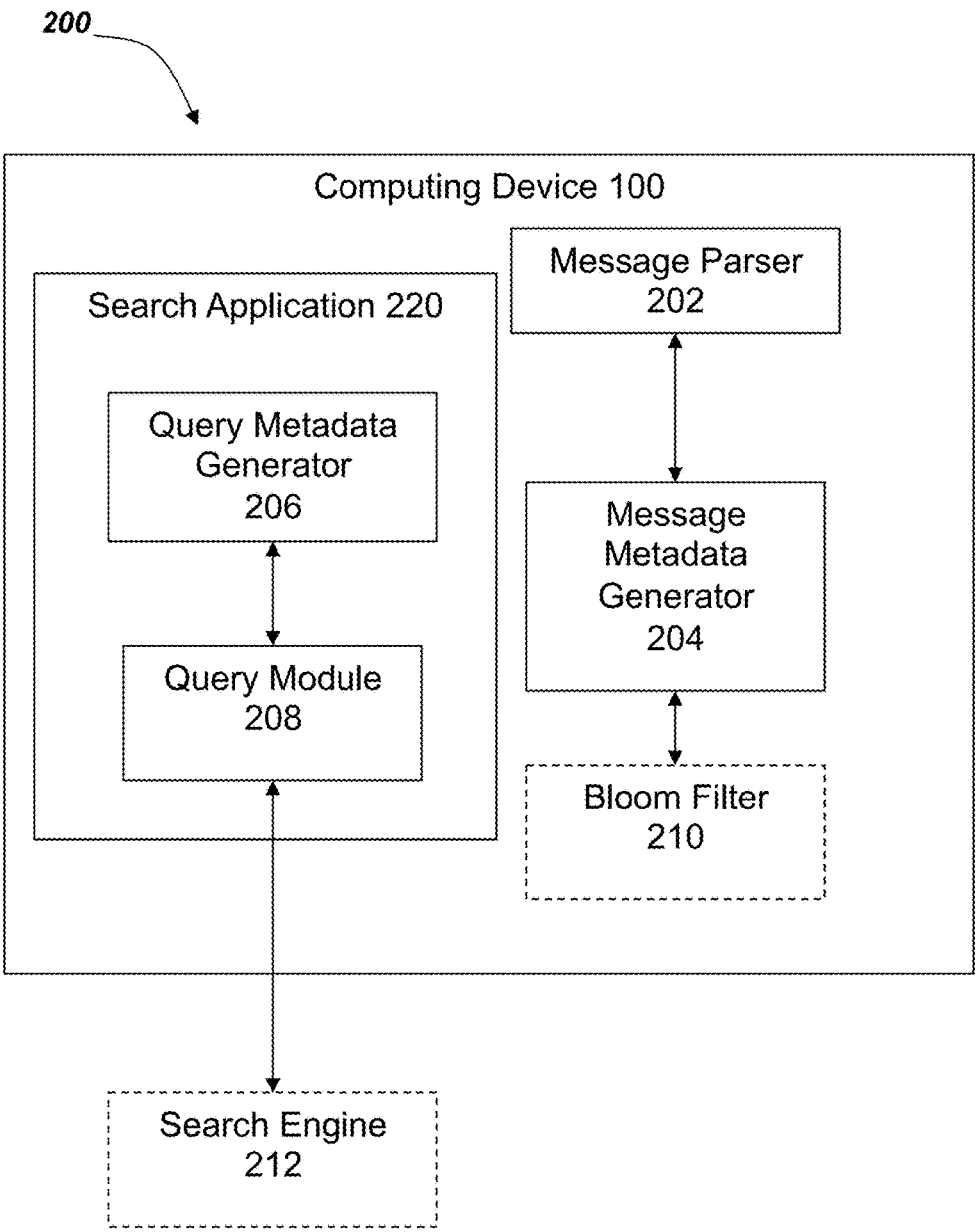
FIG. 2A is a block diagram depicting one embodiment of a system for generating probabilistically searchable messages.

Referring now to FIG. 2A, a block diagram depicts one embodiment of a system 200 for generating and searching probabilistically searchable messages. In brief overview, the system 200 includes a computing device 100. The computing device 100 may be a computing device 100 as described above in connection with FIGS. 1A-1C. In some embodiments, the system 200 also includes a message parser 202 executing on the computing device 100. The system also includes a message metadata generator 204 executing on the computing device 100. The system includes a search application 220. The search application 220 includes a query metadata generator 206 executing on the computing device 100. The search application 220 further includes a query module 208 executing on the computing device 100.

In one embodiment, the message parser 202 is provided as a software application. In another embodiment, the message parser 202 is provided as a hardware application. The message parser 202 may combine software and hardware elements. In some embodiments, the message parser 202 is configured to obtain a textual message and to extract a plurality of words from the textual message, as described in further detail below in connection with FIG. 3A.

In one embodiment, a textual message is a set of textual data provided by a user of the computing device 100. In another embodiment, the user intends to send the textual message electronically from one computing device 100 to another computing device 100b (not shown). Textual data may include alphanumeric characters. Textual data may include alphanumeric strings. Textual data may include punctuation. Textual data may include special characters, such as the "@" symbol. Textual data may include characters from any writing system useable for the representation of any language. The textual message may be sent from one computing device 100 to another computing device 100b using any protocol suitable for exchanging textual data between computing devices as disclosed above in connection with FIGS. 1A-1C. The textual message may be, by way of example and without limitation, an electronic mail message (email), such as a message conveyed using the simple mail transfer protocol (SMTP) or a message conveyed using the post office protocol (POP). The email may be drafted and/or transmitted using a Web email application such as the GMAIL application produced by Google, Inc. of Mountain View, Calif., the YAHOO email application produced by Yahoo, Inc. of Sunnyvale, Calif., or the OUTLOOK webmail program produced by Microsoft Corporation of Redmond, Wash.

In one embodiment, the message metadata generator 204 is provided as a software application. In another embodiment, the message metadata generator 204 is provided as a hardware application. The message metadata generator 204 may combine software and hardware elements. In some embodiments, the message metadata generator 204 is configured to cryptographically hash each word of the plurality of words extracted by the message parser 202 as described in further detail below in connection with FIG. 3A The message metadata generator 204 may cryptographically hash each word using a cryptographic hash function. In one embodiment, a hash function is a function that maps an element of data having an arbitrary size to another element of data having a fixed size. In some embodiments, a cryptographic hash function is a hash function, converting a first data element commonly called a "message" to a second data element commonly called a "digest," that is practically impossible to reverse. The reversal of the cryptographic hash function may be computationally infeasible, requiring an impractically large number of computational steps to reverse using the capacity of currently available computing devices. The cryptographic hash function may have the property of pre-image resistance, guaranteeing that it is computationally hard to find, for a particular digest, the message from which the cryptographic hash function produced the digest. The cryptographic hash function may have the property of collision resistance, whereby it is difficult to find a first and second message such that the digest produced from the first message is the same as the digest produced from the second message; finding such a first and second message may be known as a "collision." In some embodiments, to guarantee collision resistance, the digest produced by the cryptographic hash function may be at least twice as long as the length necessary to guarantee pre-image resistance. As a non-limiting example, the cryptographic function may be the Merkle-Damgård hash function (MD5). As another non-limiting example, the cryptographic hash function may be the Secure Hash Algorithm (SHA-1).

The cryptographic hash function may be a key hash function, which combines a message with a second data element whose contents are secret to other parties, known as a secret key, to produce a digest. In some embodiments, the cryptographic hash function is a message authentication code (MAC) hash function. The MAC hash may have the property that a person who has sent a message of the person's choosing to be hashed by the MAC algorithm and received the digest produced by that message in return cannot guess the digest produced for another message, if the person does not possess the secret key. The MAC hash function may be a keyed-hash message authentication code (HMAC) function. In one embodiment, an HMAC function is an MAC function that for a given cryptographic hash function H, a message M, a secret key K, a one-block long hexadecimal constant called i_pad and a second one-block long hexadecimal constant called o_pad, makes K into the block length by either padding K with zeroes or hashing K to reduce its length, hashing the concatenation of K XOR i_pad with M to produce an intermediate digest using H, then using H to hash the concatenation of K XOR o_pad with the intermediate digest to produce the final digest.

In some embodiments, the message metadata generator 204 is configured to map each cryptographically hashed word to a plurality of tokens, as set forth in further detail below in connection with FIG. 3A. The message metadata generator 204 may be configured to generate a set of tokens associated with the textual message, where the set of tokens includes each plurality of tokens associated with each cryptographically hashed word, as set forth in further detail below in connection with FIG. 3A.

In some embodiments, the message metadata generator 204 is configured to filter the set of tokens associated with the textual message. In one of these embodiments, the message metadata generator 204 uses a Bloom filter (depicted in shadow in FIG. 2A as Bloom Filter 210). In some embodiments, a Bloom filter 210 is a data structure that stores set membership information for potential set elements in a space-efficient manner that eliminates false negative results while permitting a low rate of false positive results that may be tuned by adjusting the parameters of the Bloom filter 210. In one embodiment, the Bloom filter 210 is an array of bits that are initially all set to the same first binary value, such as "0"; an "array" may be any indexed physical or virtual data store in which each stored element may be looked up uniquely by index number, and in which there is a fixed quantity of such index numbers. In one embodiment, a "bit" is anything in a physical or virtual system that can store a single binary digit. In some embodiments, an element of data is added to a Bloom filter 210 by running some number k of hash functions, as defined above in connection with FIG. 2A, each of which maps the data element to some index in the array; the insertion involves converting each bit to which each of the k hash function maps the data element to a second binary value, such as "1." Checking whether a second element is contained in the Bloom filter 210 may involve performing the k hash functions on the second element, and checking whether each bit to which the second element maps under each hash function has been converted to the second binary value; if any such bit has not been converted, the second element is certainly not in the Bloom filter 210. If all of the bits have been converted, the second element may have been inserted in the Bloom filter 210; the second element may appear to have been inserted in the Bloom filter 210 when in fact some other combination of elements was inserted, the combination mapping to the complete set of bits to which the second data element maps, creating a false positive. The false positive rate as a statistical matter may be determined by the ratio of the number of bits in the bit array to the number of elements in the set to be mapped to the bit array.

Figure 2B:
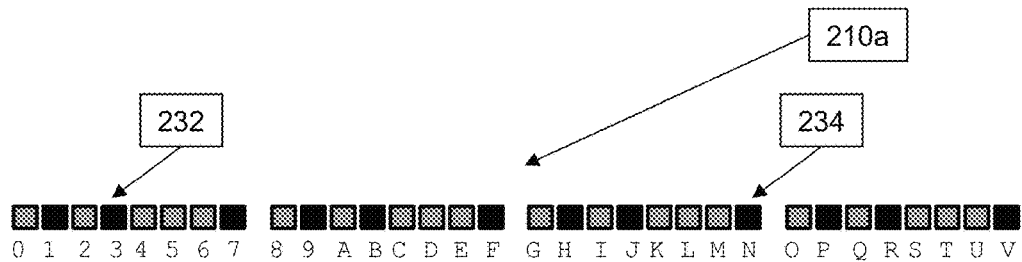
FIG. 2B is a block diagram illustrating an exemplary embodiment of a Bloom filter.
Figure 2C:
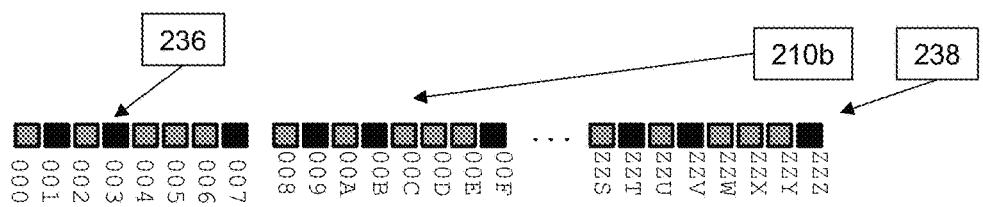
FIG. 2C is a block diagram illustrating an exemplary embodiment of a Bloom filter.

The extraction of all elements from the Bloom filter 210 may be performed by looking up each element that the hash functions map to each combination of k bits in the filter, for instance, by maintaining a second data structure, such as a hash table dictionary of terms, where each hash is made up of a set of indices corresponding to a given data element using the hash functions. As a non-limiting example, each index in the Bloom filter 210 may correspond to one element in the set of all possible elements that may be inserted in the Bloom filter 210. For instance, an eight-bit Bloom filter 210 may have indices corresponding to the digits 0-1; as a result, a positive entry for the second index may lead to the digit "1" being extracted from the Bloom filter 210. Likewise, where an eight-bit Bloom filter 210 has indices mapped to the letters A-H, a positive entry for the second index may lead to the letter "B" being extracted from the Bloom filter 210. As a further example, a Bloom filter 210$a$ having 32 bits, as illustrated in FIG. 2B, may map to the decimal digits 0-9 and the letters A-V; thus, an entry in the fourth index 232 may lead to the extraction of the number "3," while an entry in the $24^{th}$ index 234 may lead to the extraction of the letter "N," and the total extracted elements from the depicted Bloom filter 210$a$ may be "1 3 7 9 B F H J N P R V." In another embodiment, as illustrated in FIG. 2C, a Bloom filter 210$b$ corresponding to all possible three-character codes using characters drawn from the digits 0-9 and the letters A-Z has 3^36 bits, each mapped to one three-character code, so that an entry at the $4^{th}$ index 236 causes the extraction of the code "003" and an entry at bit 2^36 238 causes the extraction of the code "ZZZ"; the total extracted elements as shown may be "001 003 007 009 00B . . . 00F ZZT ZZV ZZZ." The mapping of the indices to corresponding elements may be in any order, including, without limitation, a dictionary order, a random order, or an order corresponding to a character-encoding standard. In some embodiments, elements are extracted from the Bloom filter 210 by traversing the Bloom filter 210 from its first index to its last index and extracting each element for which the corresponding index has an entry; the effect of the traversal may be to place the extracted elements in the order in which the elements are mapped to the Bloom filter 210 bits, such as a dictionary order where the mapping is in dictionary order. The order of the extracted set of elements may not correspond to the order in which the elements were inserted into the Bloom filter 210. In other embodiments, extraction of all elements from the Bloom filter 210 may be performed by repeating all of the hash functions for every single term in a dictionary of terms, checking each element for inclusion in the Bloom filter 210, and recording the ones determined to be included.

In some embodiments, the message metadata generator 204 is configured to store the filtered set of tokens associated with the textual message in metadata associated with the textual message. In one embodiment, metadata is information describing a set of data, such as the data in a textual message. Metadata may include information about when the textual message was created. Metadata may include information concerning identifying the author of the textual message. Metadata may include keywords or tokens that may be used to search for the textual message in a larger set of textual messages.

In one embodiment, the search application 220 is provided as a software application. In another embodiment, the search application 220 is provided as a hardware application. The search application 220 may combine software and hardware elements. In some embodiments, the search application 220 is a "plug-in" that operates in conjunction with an application or service. For instance, the search application 220 may be a plug-in that is executed by the computing device 100 within a web browser as described above in connection with FIGS. 1A-1C.

In one embodiment, the query metadata generator 206 is provided as a software application. In another embodiment, the query metadata generator 206 is provided as a hardware application. The query metadata generator 206 may combine software and hardware elements. In some embodiments, the query metadata generator 206 is configured to obtain a textual query; to extract, from the textual query, at least one word; to cryptographically hash the at least one word; to map the cryptographically hashed at least one word to a plurality of tokens; and to generate a set of tokens associated with the query, the set of tokens including each plurality of tokens associated with each cryptographically hashed word, as set forth in further detail below in connection with FIG. 3A.

In one embodiment, the query module 208 is provided as a software application. In another embodiment, the query module 208 is provided as a hardware application. The query module 208 may combine software and hardware elements. In some embodiments, the query module 208 is configured to receive, from a search engine 212, at least one textual message including metadata including the plurality of tokens.

In one embodiment, a search engine 212 is a software or hardware application designed to receive a data element (which may be referred to as a query) and to locate, in a set of data objects, one or more data objects associated with data containing at least one part of the query. A data object may be associated with data containing at least one part of the query if the data object contains the data. A data object may be associated with data containing at least one part of the query if the data object is associated with metadata containing at least one part of the query. In some embodiments, the search engine 212 returns only data objects associated with data containing all of the contents of the query. For some portions of the query, the search engine 212 may return only data objects associated with data containing the contents of those portions in the order presented; for instance, the search engine 212 may search for exact phrases matching a particular phrase included in the query in quotation marks. In other embodiments, the search engine 212 ignores the order of query contents within the data objects searched, and checks for the presence of the query contents in data associated with the data objects.

The search engine 212 may be designed to search a single computing device. The search engine 212 may be designed to operate on one computing device while searching another remote device. The search engine 212 may be designed to search a network of devices; for instance, some search engines 212, known as web search engines, are designed to search the Internet for content relevant to the query. Other search engines search the contents of a particular data store located on one or more devices; for instance, a search engine 212 may be designed to search the contents of a user's email account for messages matching a query. The data store may be kept in local memory, memory on a remote machine or cloud service, or some combination of local and remote storage.

The search engine 212 may be located on the computing device 100. The search engine 212 may be located on one or more remote devices. In some embodiments, the search engine 212 is a third-party product produced by a company specializing in search engines 212; examples are the GOOGLE search engine manufactured by Google, Inc. of Mountain View, Calif. and the BING search engine manufactured by Microsoft Corporation of Redmond, Wash. In some embodiments, a search engine designed to search a third-party email provider is included in the suite of features provided with the email service. For instance, the GMAIL email service, manufactured by Google, Inc. of Mountain View, Calif., may include search functionality also produced by Google, Inc. In other embodiments, a third-party email provider uses search functionality manufactured by an additional entity to search the third-party email contents for a user.

Although for ease of discussion the message parser 202, message metadata generator 204, query metadata generator 206, and query module 208 are described as separate modules, it should be understood that this does not restrict the architecture to a particular implementation. For instance, these modules may be encompassed by a single circuit or software function.

Figure 3A:
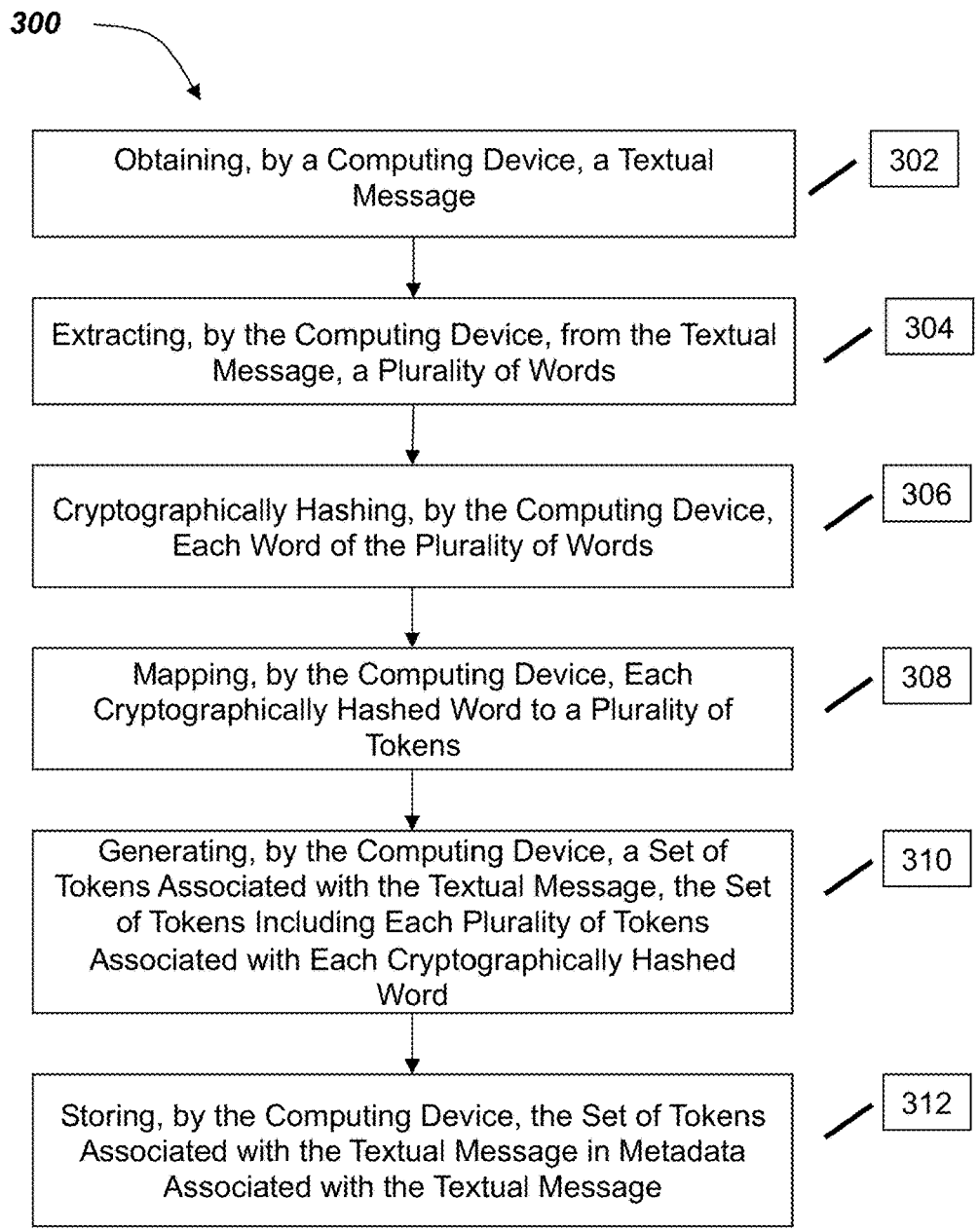
FIG. 3A is a flow diagram depicting an embodiment of a method for generating probabilistically searchable messages.

Referring now to FIG. 3A, a flow diagram depicts one embodiment of a method 300 for generating probabilistically searchable messages. In brief overview, the method includes obtaining, by a computing device, a textual message (302). The method 300 includes extracting, by the computing device, from the textual message, a plurality of words (304). The method 300 includes cryptographically hashing, by the computing device, each word of the plurality of words (306). The method 300 includes mapping, by the computing device, each cryptographically hashed word to a plurality of tokens (308). The method 300 includes generating, by the computing device, a set of tokens associated with the textual message, the set of tokens including each plurality of tokens associated with each cryptographically hashed word (310). The method 300 includes storing, by the computing device, the filtered set of tokens associated with the textual message in metadata associated with the textual message (312).

Referring still to FIG. 3A in greater detail, and in connection with FIG. 2A, the message parser 202 obtains a textual message (302). In some embodiments, a user of the computing device 100 enters the textual message; for instance, the user may type the textual message on a keyboard 126 as disclosed above in connection with FIGS. 1A-1C. In some embodiments, the user composes the textual message within an application executing on the computing device. For example, the user may compose a new email message in an email application executing on the computing device. The user may compose a new message on a webmail application operating within a web browser, as described above in connection with FIGS. 1A-1C. The user may compose a new message using any tools available for creating a textual document on a computing device. The textual message may be created in response to another message; for instance, the user may reply to an email from another user. The textual message may contain the text of an earlier message to which the textual message is a reply. In one embodiment, the message parser 202 is provided as a plug-in to a webmail application. In another embodiment, the message parser 202 receives the textual message when a user enters a command to the webmail application; for example, when the user enters, via a user interface element, an instruction to send the message (e.g., by clicking on a user interface element, such as a button, labeled "send"), the message parser 202 may intercept the instruction to send the message and access the textual message. As another example, when a draft of the message is saved (either automatically by the webmail application or upon receiving an instruction from the user), the message parser 202 may access the textual message.

In some embodiments, the message parser 202 converts the textual message from its original form into a plain text form; that is, the system may normalize the obtained textual message into plain text. For example, if the textual message is originally in hypertext markup language (HTML) format, the message parser 202 may normalize the textual message to plaintext; for instance, the message parser 202 may remove HTML tags, scripting language, style sheet references, and other elements besides the textual data contained in the textual message. Likewise, the message parser 202 may remove tags from an extensible markup language (XML) document to produce a plain text version. The message parser 202 may include textual data from fields other than the main message body of the message; for instance, the message parser 202 may include text from an email address field in the textual document. The message parser 202 may include text from an email subject field in the textual document. In some embodiments, the message parser 202 converts each word in the textual message into lower-case form.

Figure 3B:
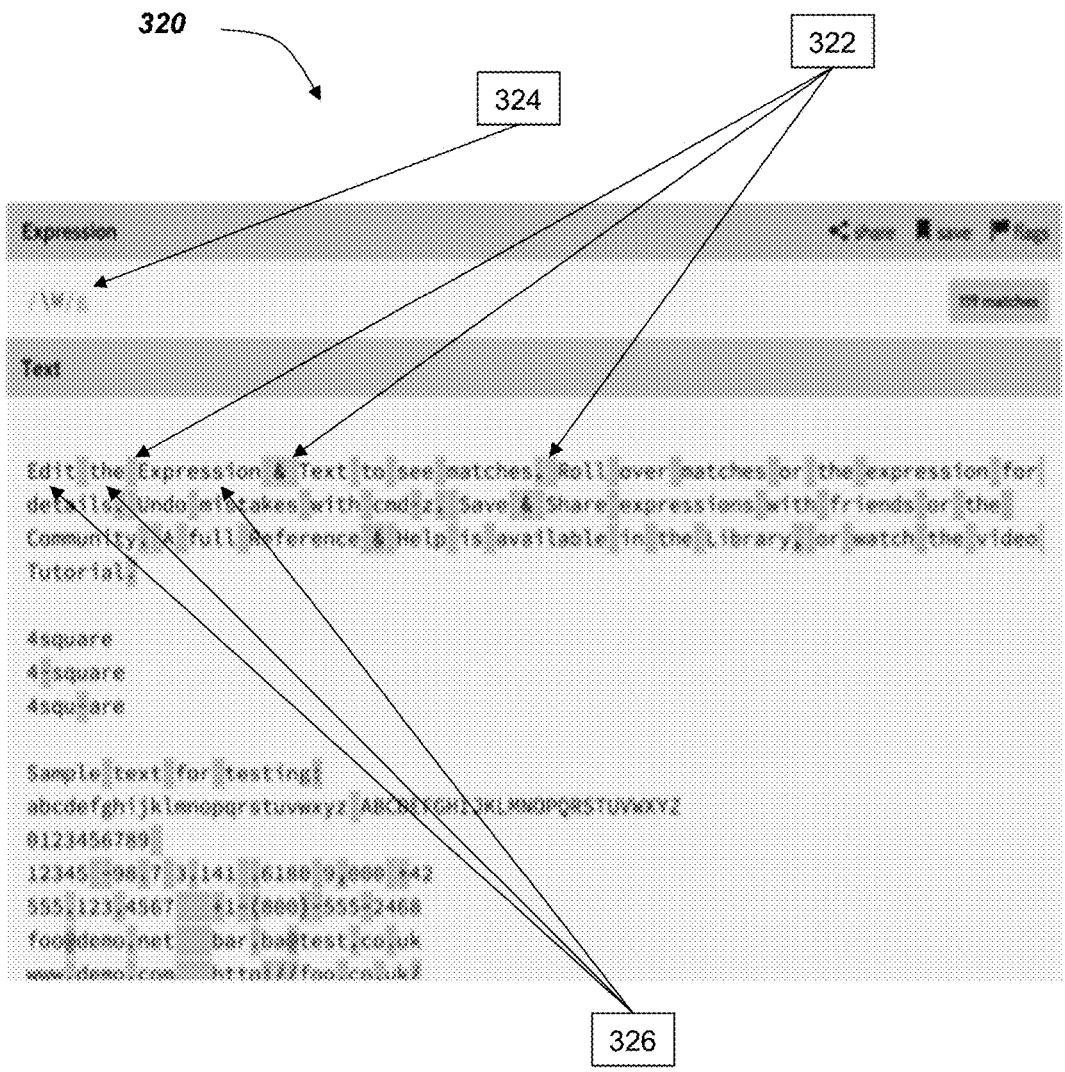
FIG. 3B is a screenshot of a textual message for to be tokenized according to some embodiments of a method for generating probabilistically searchable messages.

The message parser 202 extracts a plurality of words from the textual message (304). In some embodiments, the message parser extracts the plurality of words by tokenizing the textual message. FIG. 3B is a screen-shot of a textual message for tokenization 320 in one embodiment. In an embodiment, the message parser 202 identifies at least one separator character 322; for instance, separator characters 322 may include whitespace, such as carriage returns or the spaces place between words, punctuation, such as periods, and some special characters such as ampersands. The message parser 202 may identify separator characters 322 by searching for one or more regular expressions 324 in the textual message 320. In one embodiment, a regular expression is a sequence of characters used for searching and pattern matching on the computing device 100. The regular expression may combine one or more characters or string literals to search for in a textual message with one or more meta-characters that describe patterns to search for; as a non-limiting example, the meta-character "\W" may instruct the computing device 100 to search for non-alphanumeric characters. The regular expression 324 may search for non-word characters. The message parser 202 may identify any non-empty string of characters 326 between any two-separator characters 322 as a word to be extracted. For example, the first sentence in the textual message 320 shown in FIG. 3B may be identified by the message parser 202 as containing the words "Edit," "the," "Expression," "Text," "to," "see," and "matches," given what the separator characters 322 illustrate. The message parser 202 may save extracted words in a data structure such as a table, a linked list, a tree, a vector, an array, or any other form or type of data structure. As is well known to one of ordinary skill in the art, a regular expression is composed of primitive sets of characters combined with concatenation and operators, which create a specification for matching sequences of characters in a text.

Referring back to FIG. 3A, the message metadata generator 204 cryptographically hashes each word of the plurality of words (306). In some embodiments, the message metadata generator 204 cryptographically hashes each word using a cryptographic hash function as described above in connection with FIG. 2A. The message metadata generator 204 may use a cryptographic hash function with a large enough output digest size to render the probability of collisions substantially small; for instance, the digest size produced by the cryptographic hash function may be at least 256 bits. In some embodiments, the message metadata generator 204 cryptographically hashes each word using a key hash function. The key hash function may be a key hash function as described above in connection with FIG. 2A. In some embodiments, the message metadata generator 204 cryptographically hashes each word using a MAC key hash function. In other embodiments, the message metadata generator 204 cryptographically hashes each word using an HMAC key hash function. The message metadata generator 204 may use the same hash function for every word from every message belonging to a particular user account; for instance, the message metadata generator 204 may request a secret key from a user of a particular email account on one occasion, and then consistently use that secret key thereafter. In one embodiment, this leads to each word regularly hashing to the same digest.

The message metadata generator 204 maps each cryptographically hashed word to a plurality of tokens (308). In some embodiments, each of the plurality of tokens is smaller than the digest of the cryptographically hashed word; for instance, each token may be a three-character token. The message metadata generator 204 may map the cryptographically hashed words to the tokens in a consistently reproducible manner. As an example, the message metadata generator 204 may maintain a data structure linking each cryptographically hashed word to its corresponding plurality of tokens. In other embodiments, the message metadata generator 204 ensures consistently reproducible production of tokens by using the same process to produce the tokens from each cryptographically hashed word; for instance, the message metadata generator 204 may perform the same mathematical operation on each cryptographically hashed word every time the message metadata generator 204 produces the tokens, thus ensuring that the same cryptographically hashed word produces the same tokens on a consistent basis. As a non-limiting example, if the cryptographically hashed word is a 256-bit string, the message metadata generator 204 may divide the string into 8 32-bit segments, calculate the modulus of each of the 32-bit segments with a randomly chosen number, and use each result as a pointer to a dictionary of tokens. In some embodiments, message metadata generator 204 uses the same randomly chosen number for all cryptographically hashed words, to ensure that each cryptographically hashed word will consistently map to the same set of tokens. In some embodiments, each token is three characters long, and each cryptographically hashed word is mapped to three tokens; thus while the probability that a different cryptographically hashed word will share one token with a given cryptographically hashed word from the message is moderately low, the probability that the words will share all three tokens is far lower.

The message metadata generator 204 generates a set of tokens associated with the textual message, the set of tokens including each plurality of tokens associated with each cryptographically hashed word (310). In some embodiments, the message metadata generator 204 stores all of the tokens associated with all of the cryptographically hashed words from the textual message in a data structure, such as a linked list. In some embodiments, the message metadata generator 204 adds each token to the data structure when the token is mapped from a cryptographically hashed word, so that the generation of the set of tokens associated with the textual message occurs at substantially the same time as the mapping of each cryptographically hashed word to its corresponding plurality of tokens. In some embodiments, the message metadata generator 204 inserts each token into the Bloom filter 210, as described below, when the token is mapped from a cryptographically hashed word; in other words, the Bloom filter 210 may serve as the data structure used to generate the set of all tokens associated with the textual message.

The message metadata generator 204 stores the set of tokens associated with the textual message in metadata associated with the textual message (314). In some embodiments, the set of tokens is inserted into the body of the textual message; for instance, the set of tokens may be appended to the end of the textual message. The set of tokens may be inserted into a field of the textual message typically used for metadata; for instance, where the textual message is an email, the set of tokens may be inserted in the header of the email. In some embodiments, the textual message with the added tokens is stored where the similar textual messages are typically stored; for instance, if the textual message is an email, it may be stored under the appropriate folder within a user's user account, such as a folder for sent messages, or a folder for drafts. A search engine 212 may index the textual message using the inserted metadata; for instance, the search engine 212 may be a third-party search engine associated with an email service, as described above in connection with FIG. 2A.

In some embodiments, the system 200 includes functionality for optimizing the tokens. For example, the message metadata generator 204 may eliminate duplicate tokens from the set of tokens associated with the textual message. In other embodiments, the system 200 includes functionality for improving the security of the tokens. As an example, the message metadata generator 204 may reorder the set of tokens into a different order than the order in which the tokens were derived from the extracted words. The new order may be random. In some embodiments, the message metadata generator 204 filters the set of tokens associated with the textual message, using a Bloom filter 210. In some embodiments, the message metadata generator 204 filters the set of tokens by inserting each token into the Bloom filter 210 then extracting all tokens from the Bloom filter 210 once they have all been inserted. The message metadata generator 204 may insert each token into the Bloom filter 210 as described above in connection with FIG. 2A. In some embodiments, the message metadata generator 204 applies three hash functions to each token, mapping each token to three bits in the Bloom filter 210. The Bloom filter 210 may have a large number of bits to avoid false positives; in one embodiment, the number of bits in the Bloom filter 210 is $3^{\wedge}36$. The message metadata generator 204 may extract all tokens from the Bloom filter 210 as described above in connection with FIG. 2A.

Filtering the tokens using the Bloom filter 210 may eliminate duplicate tokens from the set of tokens. For instance, if the original textual message included the phrase "my car is the red car," the set of tokens associated with the textual message may include the tokens associated with "car" twice, prior to filtering; after extraction from the Bloom filter 210, only one set of tokens associated with the word "car" may remain in the set of tokens. In addition, the extraction process from the Bloom filter 210 may not preserve the order in which the tokens were inserted into the Bloom filter 210, so that the tokens extracted do not reveal the order of the words in the original textual message; furthermore, the tokens from each word may not be extracted consecutively.

The system 200 may optimize the tokens by modifying the plurality of extracted words prior to mapping the extracted words to tokens. For instance, the message metadata generator 204 may eliminate duplicate words from the plurality of extracted words. The message metadata generator 204 may eliminate duplicate words from the plurality of cryptographically hashed words. The message metadata generator 204 may reorder the plurality of extracted words, either randomly or by reference to an index. The message metadata generator 204 may reorder the plurality of cryptographically hashed words. In some embodiments, the message metadata generator 204 filters the plurality of words using a Bloom filter 210; the filtering may occur with the extracted words or with the cryptographically hashed words. In some embodiments, the message metadata generator 204 filters the plurality of words by inserting each word into the Bloom filter 210 then extracting all words from the Bloom filter 210 once they have all been inserted. The message metadata generator 204 may insert each word into the Bloom filter 210 as described above in connection with FIG. 2A. In some embodiments, the message metadata generator 204 applies three hash functions to each word, mapping each word to three bits in the Bloom filter 210. The Bloom filter 210 may have a large number of bits to avoid false positives; in one embodiment, the number of bits in the Bloom filter 210 is $3^{\wedge}36$. The message metadata generator 204 may extract all words from the Bloom filter 210 as described above in connection with FIG. 2A.

In some embodiments, the message metadata generator 204 inserts each token into the Bloom filter 210 when the token is mapped from a cryptographically hashed word; in other words, the Bloom filter 210 may serve as the data structure used to generate the set of all tokens associated with the textual message.

Figure 3C:
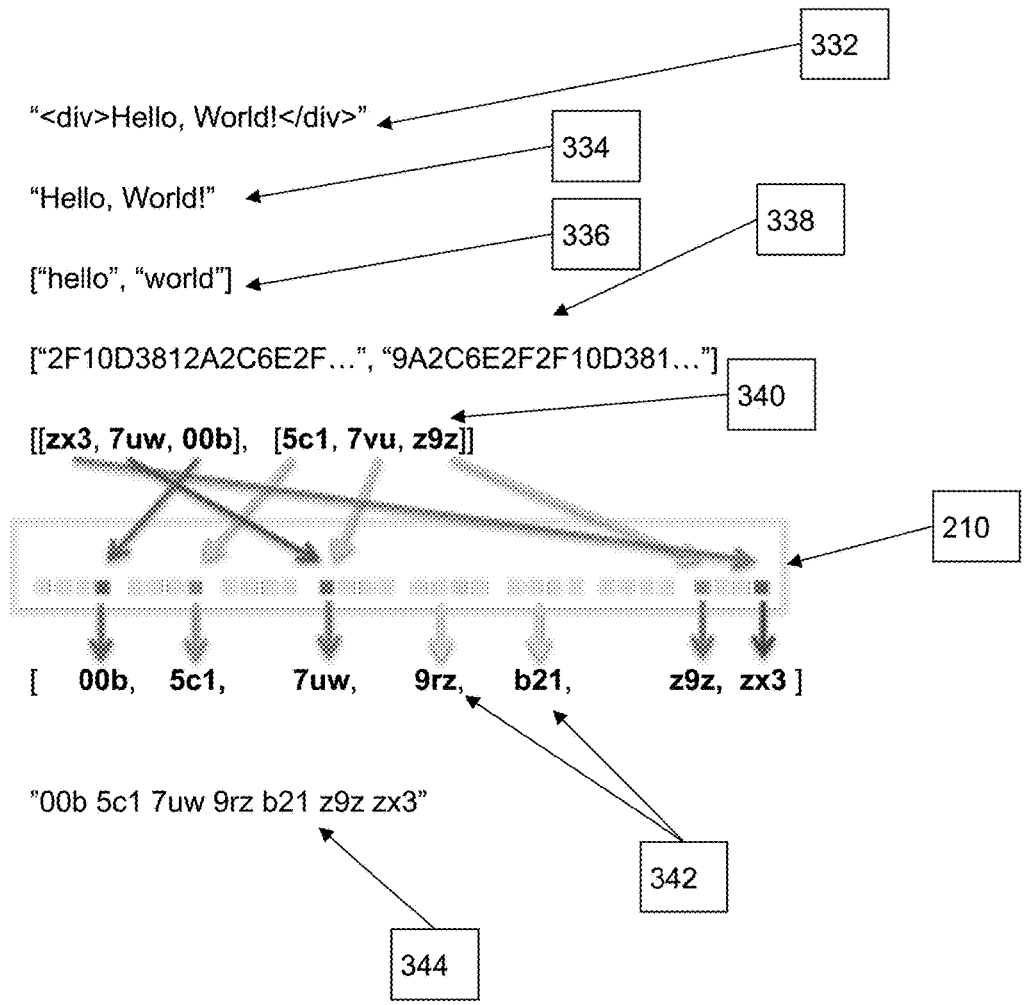
FIG. 3C is a block diagram describing an embodiment of a method for generating probabilistically searchable messages.

FIG. 3C illustrates an embodiment of the method 300. In some embodiments, a message 332 in HTML format is converted to plaintext format 334; words 336 extracted from the plaintext message 334 by tokenizing the message 334 are cryptographically hashed to produce digests 338. The message metadata generator 204 may map each cryptographically hashed word 338 to a set of three-letter tokens 340 (e.g., one set of tokens per word), which are then optionally inserted into the Bloom filter 210; the three-letter tokens may be taken from a base-36 character set including the digits from 0-9 and the 26 letters of the English alphabet, yielding 36^3 possible three-letter tokens. In some embodiments, the message metadata generator 204 adds at least one random entry 342 to the Bloom filter 210, to ensure a desired false-positive rate. The set of three-letter tokens 344 for insertion in the metadata may be extracted from the Bloom filter 210. In some embodiments, the addition of random entries to the Bloom filter 210 helps to protect against traffic analysis and correlation attacks; while the same tokens may be present in two messages that contain one or more words, even two identical messages may have different randomly selected tokens, so that comparing multiple messages to detect patterns in token generation is largely fruitless. As an example, the message metadata generator 204 may add sufficient tokens to the Bloom filter to result in a total of 4,000 tokens per textual message. In some embodiments, the "noise" tokens 342 added to the Bloom filter 210 increases the false positive rate; the Bloom filter 210 size, and the number of "noise" insertions may be selected to produce a low false-positive rate while introducing enough noise to frustrate correlation attacks.

In some embodiments, the computing device 100 sends the textual message to another computing device 100b; for instance, where the textual message is an email, the textual message may be sent to its recipient. In some embodiments, the tokens are removed from the metadata associated with the textual message prior to the textual message being sent; a copy of the textual message containing the metadata may be retained, for instance in a "sent mail" folder belonging to a sending user's email account. In other embodiments, the textual message as sent retains the tokens in metadata associated with the textual message. In some embodiments, the cryptographic hashing and token mapping processes make it difficult for the recipient, or an intercepting party, to gain information concerning the textual message from the tokens.

In some embodiments, the computing device 100 encrypts the textual message. The computing device 100 may encrypt the textual message using a cryptographic system as described above in connection with FIG. 2A. The computing device 100 may encrypt the body of the textual message but not the inserted tokens, permitting a search engine 212 to index the textual message using the tokens. As an example, FIG. 3D illustrates an embodiment of a textual message 350 that is being sent with inserted tokens. The textual message 350 may have a header 352, such as a multi-purpose Internet mail extension (MIME) header containing metadata describing the textual message; the header 352 may describe the date and time the message was sent. The header 352 may describe the sending and recipient accounts. The header 352 may describe the protocol according to which the textual message was conveyed. In some embodiments, the tokens 354 are inserted in the textual message after the header 352, but before the message body 356. The message body 356 may be encrypted; for instance, the message body 356 may be encrypted using a symmetric-key encryption system. The textual message 350 may also include an unencrypted introduction 358. The introduction 358 may contain information indicating that the message was encrypted. The introduction 358 may contain information concerning a service that performed the encryption.

In some embodiments, the methods and systems described above also provide functionality for allowing a user to later search for a textual message containing one or more key words in a secure manner. By way of example, and as will be described in further detail below in connection with FIG. 4, the method 300 may include: obtaining, by a computing device, a textual query; extracting, by the computing device, from the textual query, at least one word; cryptographically hashing, by the computing device, the at least one word; mapping, by the computing device, the cryptographically hashed at least one word to a plurality of tokens; generating, by the computing device, a set of tokens associated with the textual query, the set of tokens including each plurality of tokens associated with each cryptographically hashed word; and receiving, by the computing device, from a search engine, at least one textual message including metadata comprising the set of tokens. The method may include providing, to the user, the received textual message. For example, in an embodiment in which the user entered the textual query into a user interface for searching previously generated, sent, or received documents, messages, or textual data of any kind, the system may display to the user a response to the query including the received textual message.

Figure 4:
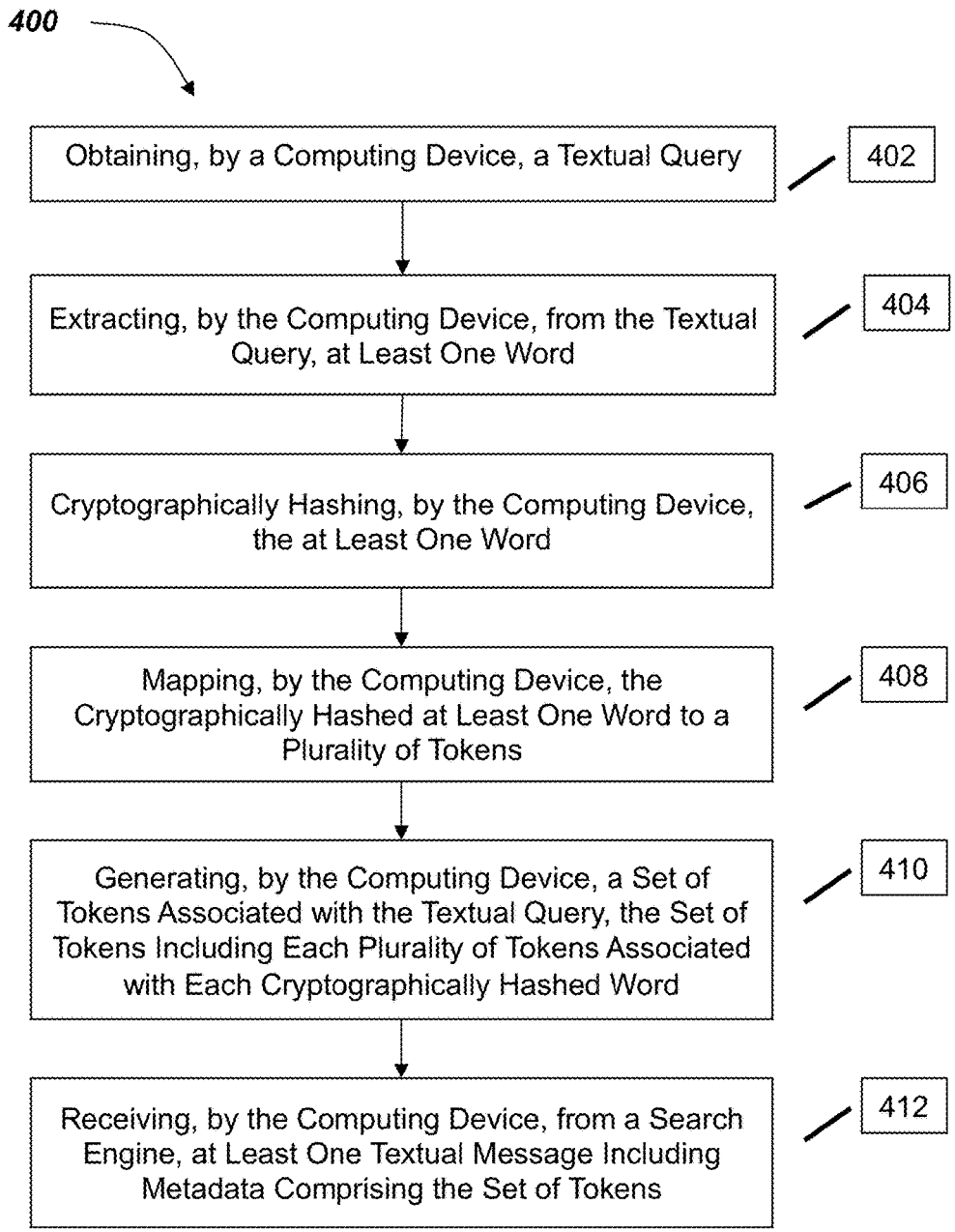
FIG. 4 is a flow diagram depicting an embodiment of a method for searching probabilistically searchable messages.

Referring now to FIG. 4, a flow diagram depicts one embodiment of a method 400 for searching probabilistically searchable messages. In brief overview, the method includes obtaining, by a computing device, a textual query (402). The method 400 includes extracting, by the computing device, from the textual query, at least one word (404). The method 400 includes cryptographically hashing, by the computing device, the at least one word (406). The method 400 includes mapping, by the computing device, the cryptographically hashed at least one word to a plurality of tokens (408). The method 400 includes generating, by the computing device, a set of tokens associated with the textual query, the set of tokens including each plurality of tokens associated with each cryptographically hashed word (410). The method 400 includes receiving, by the computing device, from a search engine, at least one textual message including metadata comprising the set of tokens (412).

Referring still to FIG. 4 in greater detail, and in connection with FIG. 2A, the query metadata generator obtains a textual query (402). In some embodiments, a user enters the search query on the computing device 100; for instance, the user may enter the search query using a keyboard 126 as described above in connection with FIGS. 1A-1C. In some embodiments, where the search application 220 operates as a plug-in, the user attempts to enter a textual query in a search field provided by a different application from the search application 220, and the search application 220 intercepts the search entry; for example, the user may be searching email in a webmail application that provides a search engine 212 for searching one or more folders in a user's email account, and the user may type text the user wishes to search for in a text entry field associated with the search engine 212. Continuing the example, the search application 220 may receive the user's text entry instead of the search engine 212, remove the entry from the entry field before the user is able to execute the search; the search application 220 may convert the user's text entry into tokens as further described below in connection with FIG. 4, and provide a query containing the tokens to the search engine 212. In other embodiments, the search application 220 includes a user interface (not shown) that prompts the user to enter a search query.

The query metadata generator 206 extracts at least one word from the textual query (404). In some embodiments, this is implemented as described above in connection with FIGS. 3A-3C.

The query metadata generator 206 cryptographically hashes the at least one word (406). In some embodiments, this is implemented as described above in connection with FIGS. 3A-3C. The query metadata generator 206 may use the same cryptographic hash function to produce the cryptographically hashed at least one word that the message metadata generator 204 uses to hash words extracted from messages, as described above in connection with FIGS. 3A-3C; for instance, where the message metadata generator 204 uses an HMAC key hash, the query metadata generator 206 may use the same HMAC key hash, with the same key.

The query metadata generator 206 maps the cryptographically hashed at least one word to a plurality of tokens (408). In some embodiments, this is implemented as described above in connection with FIGS. 3A-3C. The query metadata generator 206 may use the same mapping that the message metadata generator 204 uses to map cryptographically hashed words to keys, so that a word from the query is mapped to the same tokens to which the same word from the textual message is mapped.

The query metadata generator 206 generates a set of tokens associated with the textual query, the set of tokens including each plurality of tokens associated with each cryptographically hashed word (410). In some embodiments, this is implemented as described above in connection with FIG. 3A.

The query module 208 receives, from a search engine 212, at least one textual message including metadata including the set of tokens (412). The query module 208 may create a search query that contains the set of tokens. In some embodiments the messages that the search engine 212 searches for the queries are probabilistically searchable messages as described above in connection with FIGS. 3A-3C. In some embodiments, the tokens added to metadata associated with the textual message by the message metadata generator 204 as described above in connection with FIGS. 3A-3C are text strings, as shown in FIG. 3C, and thus may be indexed and searched by search engines 212 in the same manner as other strings. Similarly, the set of tokens generated by the query metadata generator 206 may be text strings search engines can use in search queries in the same manner as other strings. As a result, a search for the search query made up of tokens generated from the query may produce all messages containing the words contained in the query. The query module 208 may include at least one word from the originally obtained textual query in the search query; for instance, the query module 208 may produce a search query that searches for either the tokens or the textual query. As a non-limiting example, where the search is a Boolean search, the textual query is 'hello, World,' and the tokens produced from the textual query are '00b 5c1 7uw 9rz b21 z9z zx3,' the query module 208 may create a search query for "'hello, World' OR '00b 5c1 7uw 9rz b21 z9z zx3.'"

In some embodiments, the use of noise insertion in producing the probabilistically searchable message as described above in connection with FIGS. 3A-3C gives rise to a small probability of false positive results; as described above in connection with FIGS. 3A-3C, the Bloom filter 210 may be chosen with sufficient size to make false positive results unlikely. In some embodiments, the received message is encrypted; in some embodiments, the computing device 100 decrypts the received message as described above in connection with FIG. 2A. The encrypted received message may contain unencrypted portions such as an unencrypted MIME header or a set of search tokens, as described above in connection with FIGS. 3A-3D.

Embodiments of the disclosed system and methods produce and search privacy-preserving searchable textual messages. By using randomly selected tokens inserted with tokens corresponding to words from a textual message into an appropriately-sized Bloom filter 210, embodiments of the above method ensure that false negative search results are eliminated, false positive search results are minimized, and correlations between individual tokens and their originating words are practically infeasible to detect. Embodiments of the disclosed system and methods enable users to take advantage of third-party search engines to index and search encrypted messages without compromising the security of the encrypted messages. Although described in the context of messages that are exchanged between computer users, such as electronic mail messages, it should be understood that the methods and systems described herein may be applied to searching any type or form of text, including without limitation, documents, presentations, spreadsheets, or other text-based materials that a user may wish to both encrypt and later search for and identify using conventional search techniques.

It should be understood that the systems described above may provide multiple ones of any or each of the described components and these components may be provided on either a standalone machine or, in some embodiments, on multiple machines in a distributed system. The phrases 'in one embodiment,' 'in another embodiment,' and the like, generally mean the particular feature, structure, step, or characteristic following the phrase is included in at least one embodiment of the present disclosure and may be included in more than one embodiment of the present disclosure. Such phrases may, but do not necessarily, refer to the same embodiment.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices; firmware; programmable logic; hardware (e.g., integrated circuit chip, electronic devices, a computer-readable non-volatile storage unit, non-volatile memory, such as semiconductor memory devices, including EPROM, EEPROM, and flash memory devices); magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Having described certain embodiments of methods and systems for generating probabilistically searchable messages, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A computer-implemented method for generating probabilistically searchable messages, the method comprising:
   obtaining, by a computing device, a textual message generated by an application executing on the computing device;
   extracting, by the computing device, from the textual message, a plurality of words;
   cryptographically hashing, by the computing device, each word of the plurality of words;
   mapping, by the computing device, each cryptographically hashed word to a plurality of tokens;
   generating, by the computing device, a set of tokens associated with the textual message, the set of tokens including each plurality of tokens associated with each cryptographically hashed word; and
   storing, by the computing device, a filtered set of tokens associated with the textual message in metadata associated with the textual message.

2. The method of claim 1 further comprising normalizing the obtained textual message into plain text.

3. The method of claim 1, wherein cryptographically hashing further comprises hashing each word using a key hash function.

4. The method of claim 1, wherein mapping further comprises maintaining a data structure linking each cryptographically hashed word to its corresponding plurality of tokens.

5. The method of claim 1 further comprising filtering, by the computing device, the set of tokens associated with the textual message, using a Bloom filter.

6. The method of claim 5, wherein filtering further comprises adding at least one randomly-generated token to the Bloom filter.

7. The method of claim 5, wherein filtering further comprises eliminating at least one duplicate token from the set of tokens.

8. The method of claim 5, wherein filtering further comprises adding at least one random entry to the Bloom filter.

9. The method of claim 1 further comprising eliminating at least one duplicate word from the plurality of cryptographically hashed words.

10. The method of claim 1 further comprising inserting the set of tokens into the textual message.

11. The method of claim 1 further comprising encrypting, by the computing device, the textual message.

12. The method of claim 1 further comprising sending the textual message to a second computing device.

13. The method of claim 1 further comprising:
    obtaining, by the computing device, a textual query;
    extracting, by the computing device, from the textual query, at least one word;
    cryptographically hashing, by the computing device, the at least one word;
    mapping, by the computing device, the cryptographically hashed at least one word to a plurality of tokens;
    generating, by the computing device, a set of tokens associated with the textual query, the set of tokens including each plurality of tokens associated with each cryptographically hashed word; and
    receiving, by the computing device, from a search engine, the textual message including metadata comprising the set of tokens.

14. The method of claim 12 further comprising providing, to a user, the received textual message.

15. A system for generating probabilistically searchable messages, the system comprising:
    a computing device;
    a message parser, executing on the computing device, obtaining a textual message, and extracting, from the textual message, a plurality of words; and
    a message metadata generator, executing on the computing device, cryptographically hashing each word of the plurality of words, mapping each cryptographically hashed word to a plurality of tokens, generating a set of tokens associated with the textual message, the set of tokens including each plurality of tokens associated with each cryptographically hashed word, and storing the set of tokens associated with the textual message in metadata associated with the textual message.

16. A method for searching probabilistically searchable messages, the method comprising:
    obtaining, by a computing device, a textual query;
    extracting, by the computing device, from the textual query, at least one word;
    cryptographically hashing, by the computing device, the at least one word;
    mapping, by the computing device, the cryptographically hashed at least one word to a plurality of tokens;
    generating, by the computing device, a set of tokens associated with the textual query, the set of tokens including each plurality of tokens associated with each cryptographically hashed word; and receiving, by the computing device, from a search engine, at least one textual message including metadata comprising the set of tokens.

17. The method of claim 16, wherein cryptographically hashing further comprises hashing each word using a key hash function.

18. The method of claim 16 further comprising providing, by the computing device, to the user, the at least one textual message.

19. The method of claim 18, wherein providing further comprises displaying, by the computing device, to the user, the at least one textual message in response to the textual query.

20. A system for searching probabilistically searchable messages, the system comprising:
   a computing device;
   a query metadata generator executing on the computing device, obtaining a textual query, extracting, from the textual query, at least one word, cryptographically hashing the at least one word, mapping the cryptographically hashed at least one word to a plurality of tokens, and generating a set of tokens associated with the textual query, the set of tokens including each plurality of tokens associated with each cryptographically hashed word; and
   a query module, executing on the computing device and receiving, from a search engine, at least one textual message including metadata comprising the set of tokens.

* * * * *

UNITED STATES PATENT AND TRADEMARK OFFICE
CERTIFICATE OF CORRECTION

PATENT NO.         : 10,114,900 B2                                         Page 1 of 1
APPLICATION NO.    : 15/073933
DATED              : October 30, 2018
INVENTOR(S)        : Ackerly It is certified that error appears in the above-identified patent and that said Letters Patent is hereby corrected as shown below:

In the Specification

In Column 2, Line 21, delete "message for to" and insert -- message to --, therefor.

In Column 5, Line 46, delete "SCl/LAMP" and insert -- SCI/LAMP --, therefor.

In Column 14, Line 22, delete "and operators," and insert -- and repetition operators, --, therefor.

Signed and Sealed this
Fifth Day of March, 2019

Andrei Iancu
*Director of the United States Patent and Trademark Office*